United States Patent [19]

Kracklauer

[11] 4,057,437
[45] Nov. 8, 1977

[54] CONTINUOUS BELT FILTER AND FILTRATION METHOD

[75] Inventor: Aloysius C. Kracklauer, Conroe, Tex.

[73] Assignee: Sparkler Mfg. Co., Conroe, Tex.

[21] Appl. No.: 694,166

[22] Filed: June 9, 1976

[51] Int. Cl.² ............ C13D 3/16; B01D 33/02; B01D 33/18; B01D 33/34
[52] U.S. Cl. ............ 127/9; 127/2; 127/55; 210/386; 210/393; 210/401; 210/406
[58] Field of Search ............ 127/9, 55, 3, 2, 43; 210/179, 386, 393, 401, 406, 66, 67, 79, 407

[56] References Cited

U.S. PATENT DOCUMENTS

| 693,896 | 2/1902 | Parker | 210/391 |
|---|---|---|---|
| 2,678,132 | 5/1954 | Beard | 127/55 X |
| 3,225,928 | 12/1965 | Black | 210/393 X |
| 3,627,139 | 12/1971 | Burtsev | 210/393 |
| 3,756,411 | 9/1973 | Kracklauer | 210/179 |
| 3,796,317 | 3/1974 | Lippert | 210/393 |

Primary Examiner—Sidney Marantz
Attorney, Agent, or Firm—Arnold, White & Durkee

[57] ABSTRACT

An endless belt gravity filtration apparatus which includes a vacuum system for removing filter cake and for cleaning and keeping filter belt porous through reverse air flow on the endless belt filter. The belt filter has extensions along each of its continuous edges, these extensions having chains which mate with sprockets on the filter chamber to assist in driving the filter belt and to keep it aligned and from being stretched or wrinkled during the filtration process. The apparatus may be used for filtering fluids such as sugar cane juice.

9 Claims, 4 Drawing Figures

CONTINUOUS BELT FILTER AND FILTRATION METHOD

BACKGROUND OF THE INVENTION

This invention relates to gravity filtration methods and apparatus, and more particularly concerns gravity filtration apparatus of the continuous belt type, and continuous belt filter operations useful in industrial filtration.

The invention further relates to a method of filtering sugar cane juice.

Filtration methods and apparatus of the gravity type have been only infrequently employed in industrial filtration. Nevertheless, apparatus and method of this type have been recognized as potentially very valuable, and much preferred to the more common pressure type filters for many contexts of use. This has become especially true as the cost of traditional forms of energy has rapidly escalated.

In the last few years, modern polymers have become commonly available which are relatively inexpensive and which provide excellent results as flocculating agents. There has existed and now exists, a definite need in the art for improved gravity filtration processes and apparatus. There is a special need for such processes and apparatus which provide the user with a way to utilize the modern flocculating agents. This invention provides such apparatus and processes.

The recent patent to Kracklauer, U.S. Pat. No. 3,756,411, issued Sept. 4, 1973, provides gravity filtration apparatus of the continuous belt type. Applicant points out in that patent, that the gravity filtration systems of the prior art have suffered a number of distinct disadvantages. Gravity filtration processes would, however, be desirable and preferred for use in many instances in which they are not now used owing to the absence at the present time of a system of this type which is continuous and effective to remove solids at an economical rate.

The apparatus of the aforementioned Kracklauer patent represents a considerable improvement in the gravity filtration art especially as applied to industrial filtration processes. The continuous belt filter provided therein has certain advantages, but in some contexts of use is subject to yet further improvement.

The present invention provides apparatus of the continuous belt filter type, which is similar in many respects to the apparatus provided by Kracklauer U.S. Pat. No. 3,756,411. The apparatus and method provided herein, however, represent a distinct improvement over the aforementioned apparatus especially for use in many contexts.

More particularly, the apparatus improvements represented by the present invention are in the areas of driving the continuous belt, in removal of solid filtrate from the belt, in preventing sloughing off of solid particles from the belt into the filtrate, and in dewatering of the filter cake.

The method improvements represented by the present invention relate in the first instance to an overall method of filtration using a belt type filter.

In the second place, the method improvements relate in particular to a better method for filtering sugar cane juice in a sugar process, wherein a belt type filter of the type mentioned above is employed.

It would be desirable if filter apparatus of the continuous belt type could be provided wherein the continuous belt could be driven at a steady rate and in such a manner to avoid wrinkling or stretching of the filter belt, and to keep the belt tracking.

It would further be desirable if industrial filter apparatus of the continuous belt type could be provided wherein filter cake could be more conveniently removed from the belt, especially in a manner which would maintain the porosity of the belt.

It would especially be desirable if these features could be efficiently and economically provided in a continuous belt gravity filter which would be useful in industrial filtration operations.

It would be desirable to provide an improved filtration method useful in industrial filtration, wherein a continuous gravity filter is employed.

It would still further be desirable to provide an improved method for filtering sugar cane juice in a sugar refining process.

These desirable features, and other, are provided by the methods and apparatus of the present invention.

SUMMARY OF THE INVENTION

Gravity filtration apparatus and method are provided which are economical and efficient, and which require a minimum amount of supervision by labor. The apparatus includes a continuous filter belt mounted on a series of rollers. A point on the continuous belt passes first through a precoating tank wherein the belt is impregnated with precoating liquid to increase the filtration efficiency of the belt. Then the point on the belt is fed to the filtering area where the fluid to be filtered is brought into intimate contact therewith, a seal being established between the filter belt and the vessel which retains the fluid to be filtered.

A filter cake builds up on the filter belt, and means are provided for efficiently removing the filter cake therefrom.

Further, means are provided for driving the filter belt in an efficient manner such that the belt keeps tracking and is not stretched or wrinkled during the process.

Methods of industrial filtration are provided wherein such filtration is accomplished by gravity on a continuous belt, and wherein the filter cake is conveniently removed from the continuous belt.

Still further, a method of removing the fine muds and fibers from sugar cane juice is provided which includes filtering such materials from the cane juice by means of continuous belt gravity filter.

BRIEF DESCRIPTION OF THE DRAWINGS

In order that the invention may be more completely understood, reference is made to the accompanying drawings which are exemplary of the best modes of the invention known to applicant at the time of this invention, and which form a part of this specification. In the drawings.

DETAILED DESCRIPTION OF PREFERRED EMBODIMENTS

Figure 1:
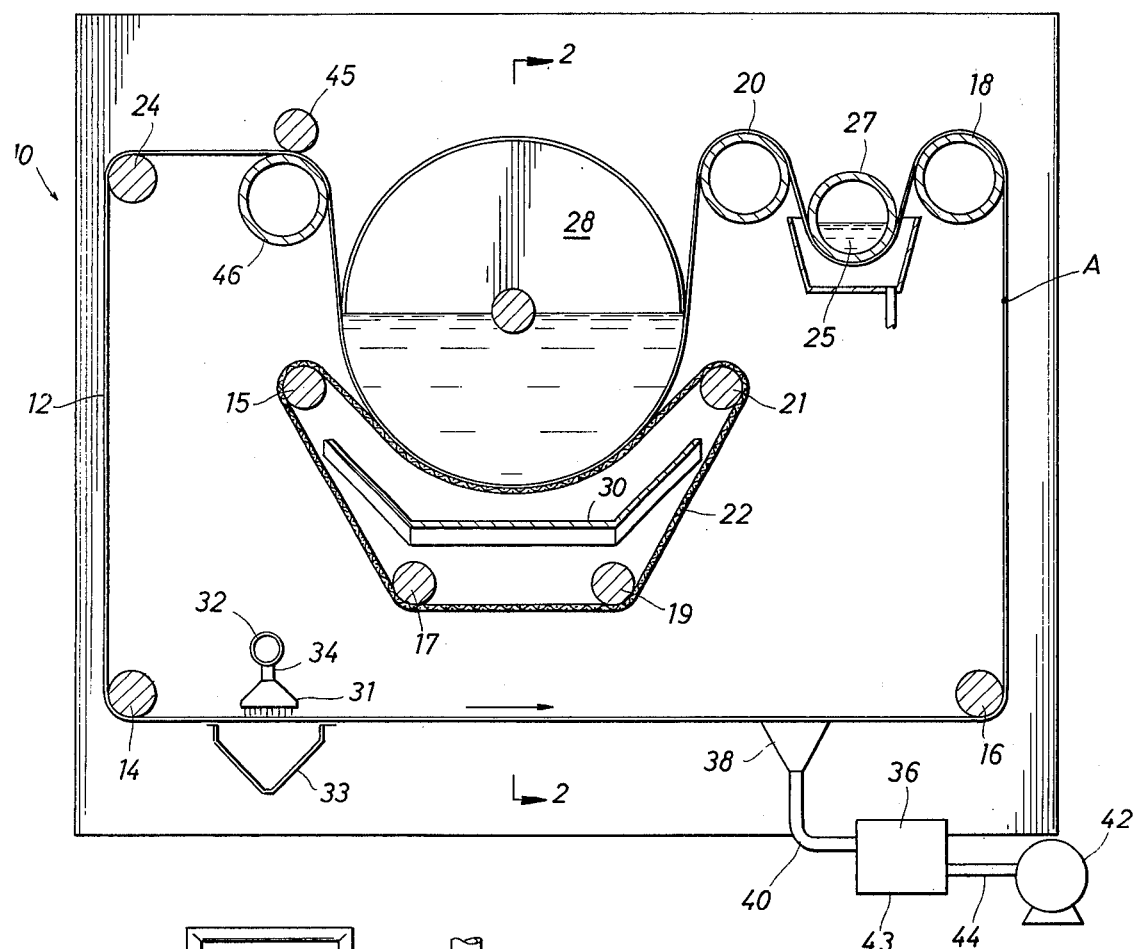
FIG. 1 is a pictorial view, in section, illustrating apparatus constructed in accordance with one embodiment of the invention.
Figure 2:
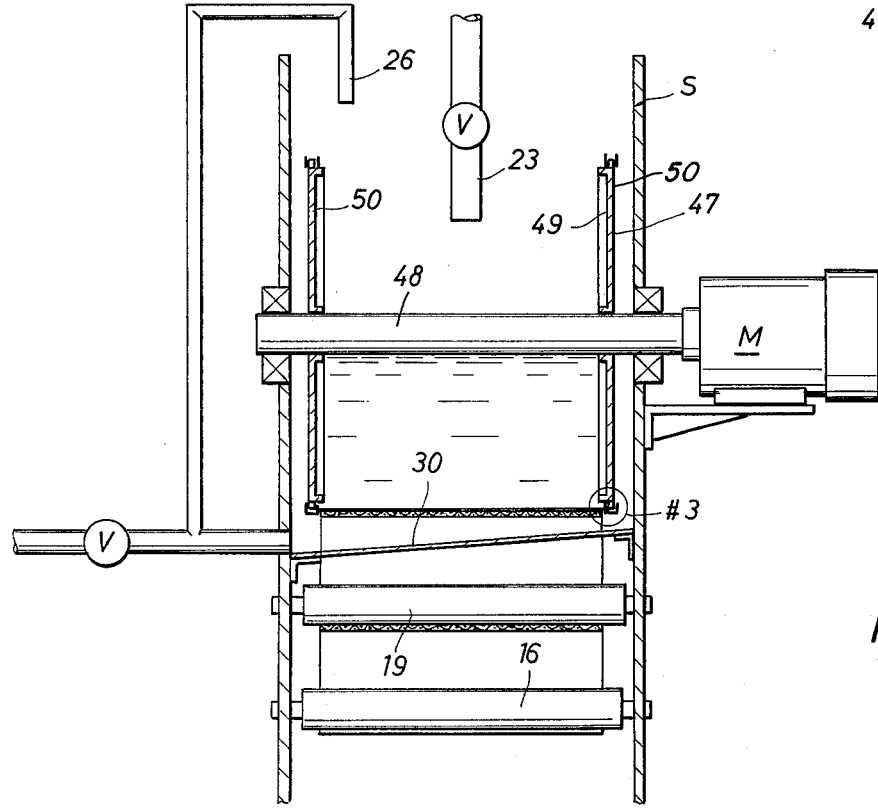
FIG. 2 is a view taken along the lines 2—2 of FIG. 1.
Figure 3:
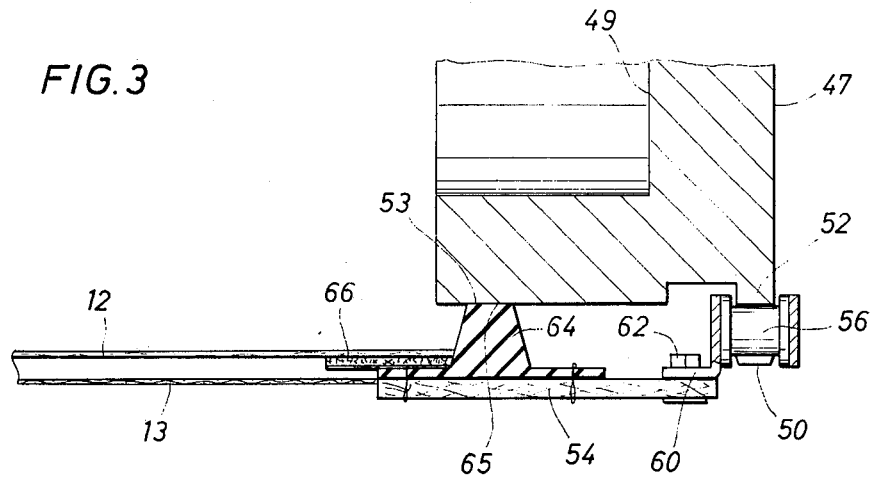
FIG. 3 is an enlarged view of a portion of the apparatus shown in FIG. 2.

Referring now to the preferred embodiments shown in FIGS. 1-3, there is illustrated in FIG. 1 apparatus 10 constructed in accordance with this invention.

The apparatus 10 comprises an endless filter belt 12 which may be stretched in any convenient manner around a series of rollers.

At least the main body portion of the filter belt 12 is desirable constructed of a material suitable for filtering the type of fluid to be filtered, for example any of the commercially available filter cloth materials. The filter belt 12 is in the form of a long continuous ribbon having a central portion and two parallel spaced-apart continuous edges. At least the central portion is constructed of a filtering material. The edges are each provided with extended portions having affixed thereto means for driving the belt, as will be more fully explained below.

In the FIGS. 1-3 embodiment, the overall path formed by the continuous belt, as seen in FIG. 1, is generally rectangular. It will be recognized, however, that any convenient path configuration can be used. The FIG. 1 configuration shows four corner rollers 14, 16, 18, and 24, the rollers 14 and 16 on the lower side of the apparatus, and the rollers 18 and 24 on the upper side of the system.

On one side of the upper portion of the system is a precoating tank 25 which may desirably be constructed in the manner described below. A precoating liquid is desirably maintained in the precoating tank 25 and precoats the filter belt 12 as it passes over the roller 27, for example in the same manner as shown in the afore-mentioned U.S. Pat. No. 3,756,411. As is well known in the art, precoating of the filter belt will not be necessary in some filtration operations. For such operations, the precoat chamber will be deleted.

Also in the upper portion of the system is a filter chamber 28 formed by a pair of parallel spaced-apart end members such as the solid wheels 50 joined by a connecting rod 48. The system is designed so that the wheels 50 may be rotated as by rotating the rod 48, as by use of the motor M. Each of the wheels 50 has an outer surface 47, an inner surface 49, and a peripheral surface 53 around the outer rim thereof. A portion of the belt 12 is at all times during the filtration process joined in sealing engagement with the wheels 50 to define the filter chamber 28. A trough 30 is disposed below the chamber 28. The trough 30, rod 48, and other portions of the apparatus, are desirable supported by a suitable support structure S. Fresh liquid to be filtered is introduced into the filter chamber 28 through the top thereof by any suitable means such as by a conduit 23 entering through the open top of the chamber, and recycled liquid may be added as through the conduit 26.

A structure similar to that used for the filter chamber 28 (i.e., the wheels 50 joined by rod 48) may desirably be used to construct the previously mentioned precoating tank 25.

The various positioning rollers such as the rollers 14, 16, 18 and 22 are spaced in any convenient manner so as to allow the endless belt 12 to be pulled taut at each point in its path of travel. It will be understood that any convenient number of positioning rollers, and any convenient spacing thereof, may be employed, the arrangement shown being merely exemplary.

Filtrate is caught in the trough 30, and may be removed by any convenient means therefrom, as by transporting through a conduit entering one end of the trough.

Suitable power means (not shown) are employed to drive the belt 12; one or more of the positioning rollers may be replaced by a drive sprocket if desired.

Assuming counter-clockwise movement of the belt 12, a point A on a first section of the belt passes first through the precoating tank wherein the belt is contacted with the precoating liquid. The point A then passes into sealing engagement with the spaced-apart wheels 50, this section of the belt thus combining with the wheels 50 to form the filter chamber 28. Fluid to be filtered in the chamber 28 then passes by gravity through the section of the belt 12 around the point A, the filtration action resulting in deposit of filter cake on the belt and the passage therethrough of a filtrate.

The cycle is continued as the belt 12 is continuously rotated.

Means are included in this embodiment of the invention for removing filter cake from the belt 12, and at the same time maintaining the essential porosity of the belt. This is accomplished by a blower and vacuum system. The blower system is comprised of a blower 31 connected to a compressed air source 32 through a line 34. The blower system operates to continuously direct a blast of compressed air from the inside of the belt 12, dislodging filter cake from the belt as it passes thereunder. The cake which falls off following this compressed air blast may be collected by any means such as the hopper 33.

Following the blast of compressed air, however, a good bit of filter cake will generally remain on the filter belt. This will decrease the porposity of the belt thereby inhibiting further filtering action in the continuous process. Applicant has relieved this difficulty by providing a vacuum system which allows for convenient removal of solids while maintaining the filter belt 12 at ambient pressure. This system comprises a solids collector head member 38 connected to a solids receptacle vessel 36 which is closed to the atmosphere, by a line 40. The vessel 36 is maintained at a vacuum by suitable means such as vaccum pump 42 connected to the receptacle vessel 36 by a suitable conduit 44. The receptacle head member 38 may be of any cross-sectional configuration, e.g. circular, and is mounted adjacent the belt 12 so that, as the belt rotates around its endless path, substantially the entire surface of the main body portion of the belt passes across the receptacle head member. As the belt 12, at atmospheric pressure, comes into contact with the solids collector head 38 at very low pressure, filter cake will be drawn off the belt 12 and will flow to the vacuum chamber which is receptacle vessel 36.

Suitable means are provided for removing filter cake from the vessel 36; for example, the bottom 43 of said vessel may be hinged, and readily opened when desired to allow filter cake to fall by gravity therefrom.

A backing 13 supports the belt 12. But, in addition to the backing 13, additional support means may if desired be included to support the belt 12 in that portion thereof wherein it forms a portion of the chamber 28. For example, a backing belt 22 may be rotated, desirable at the same speed and in the same direction as the belt 12, around the rollers 15, 17, 19. and 21 disposed just below the chamber 28. The backing belt 22, if employed, should be highly porous to allow filtrate to fall therethrough into the trough 30.

Means are also desirable included in this embodiment of the invention for minimizing the sloughing off of solid particles from the endless belt into the filtrate.

Such apparatus desirably comprises a vacuum roller or suction tube apparatus 20 which is positioned in the path of belt 12 intermediate the precoat tank 25 and the filter chamber 28, in the manner illustrated in FIG. 1. As the endless belt 12 contacts this vacuum roller, loose solid particles on the belt will be drawn into the roller to prevent such particles from sloughing off into the filtrate. The roller 20 may desirably be constructed in the form of a perforated drum, and connected to a vacuum pump in the same general manner as explained in connection with the vacuum cake removal system.

This vacuum roller apparatus 20 is of primary utility when the filter is being utilized to filter potable water, and at other times can be omitted or replaced if desired by suitable positioning rollers.

After filter cake has been deposited on the belt 12, the moisture content of the cake may be greater than desired in some contexts of use. For example, when filtering sewage, it is important that the cake be as dry as possible.

Applicant provides apparatus for dewatering the filter cake, such apparatus taking the form of a compression roller 45 adjacent a vacuum roller 46. As shown in FIG. 1, the compression roller is positioned on one side of the belt 12, and the vacuum roller is positioned on the other, desirably slightly off center with respect to the compression roller. The vacuum roller may be similar in construction to the roller 20 described above, and may desirably be maintained at a pressure considerably less than atmospheric, e.g. 5–10 inches mercury.

As the cake on the belt 12 passes the dewatering apparatus, the cake is squeezed between the rollers 45 and 46. The belt is pressured by the compression roller 45 while simultaneously being subject to the vacuum, to thereby immediately draw the moisture from the cake. Suitable means are provided for removing unvaporized liquid from the vacuum roller.

A distinctly advantageous feature of this invention, is the manner in which the filter belt 12 is designed to run true so that it will not wrinkle, stretch, or misalign. The manner in which this feature of the invention is provided is illustrated in FIGS. 2 and 3.

Therein, it is seen that each of the wheels 50 has around the circumference of the outer surface 47 thereof guiding means such as a number of equidistantly-spaced sprockets 52 which mate with the apertures in roller chain 56. The peripheral surface 51 of each wheel 50 is provided with a machined area 53 against which a leakproof seal may be established.

The filter belt 12 is supported by a supporting backing 13, such as a porous metal or plastic belt. The belt 12 has, along each continuous edge thereof, an extension which terminates with the roller chain 56. This extension includes a heavy backing piece 54, and a shaped portion 64 secured thereto. The roller chain 56 contains a plurality of spaced flanges 60 having bolts 62 therein. The bolts 62 secure the roller chain 56 to the heavy backing piece 54.

The shaped portion 64, which is desirably extruded of plastic or rubber, is sewn onto the heavy backing piece 54, and the supporting cloth 13 of the filter belt 12 is desirably retained between the portion 64 and the heavy backing piece 54. The portion 64 is provided with a continuous rib which presents an upper surface 65. The surface 65 mates with the machined area 53 of the wheel 50 to provide a leakproof seal.

Means 66 are also included for removably or detachably mounting the filter belt 12. Such means for removable mounting of the filter belt may desirably include the use of separable fasteners such as those of the type sold under the "Velcro" trademark. A male member is sewn onto the edge of the belt 12, and a mating female member is sewn onto the adjacent portion of the portion 64. (Velcro mating plastic strips are available from Velcro, Inc. of Manchester, N.H., U.S.A.). In this manner, the filter belt 12 may be readily mounted onto the system, and may be removed when it must be replaced.

Alternatively, other means could be used to detachably mount the filter belt onto the apparatus. For example, the belt 12 could be sewn onto the backing piece 54, or mating adhesive strips could be included on both the shaped portion 64 and the belt 12.

The backing piece 54 is desirably sewn onto each end of the portion 64.

In operation, in accordance with the method of the invention, the fluid to be filtered is introduced into the filter chamber 28. The belt is rotated, the point A passing first through the precoating tank 25 where it is precoated. This point then passes around the filter chamber rollers 50, at which point filter cake is desposited thereon. As the point A reaches the blower apparatus, a blast of compressed air is directed at the point to dislodge or lossen filter cake thereon. The belt at point A then passes adjacent the solids collector 38, whereupon the much lower pressure in the solids collector acts to remove filter cake from the belt.

Any convenient size of apparatus in accordance with the above construction and operation may be utilized. For example, it may be desirable to construct the wheels 50 of a diameter of about 1 foot. The cylindrical filter chamber 28 could be filled to a maximum level of one-half full assuming sealing contact of the belt 12 with the rollers 50 is maintained up to a point at the vertical center line of the filter. In most contexts of use, it will likely be desirable to maintain such liquid at some lesser level, for example one-third full.

The capacity of a filter of this type will depend not only on the dimensions of the apparatus but also upon the speed of the belt 12. The belt may be turned at any convenient rate. For example, in the filtering of municipal water supplies where high purity is desired, a very slow rate of travel, for example one to two feet per minute, would be desired. In other contexts of use, a much faster speed, for example 25 ft./min., may be appropriate.

In the refining of sugar cane to produce sugar, it is customary to crush stalks of sugar cane while spraying water thereon. The expressed juice from the sugar cane stalk (cane juice) will generally contain about 95% of the sucrose present in the stalk.

The cane juice, which is about 12°–14° Brix as it comes from the cane crushers, is treated with lime to adjust the pH to about 8.2. The cane juice is then heated to about 210° F and treated with a polyelectrolyte flocculating agent and then clarified in a series of settling trays for 2 to 6 hours at a temperature of 210°–215° F. The clarified juice is then concentrated to a heavy syrup by evaporation.

The mud from the clarifier system, which generally contains about 14–20% sucrose, is mixed with the bagasse fines (the fibrous residue), and filtered with a drum vacuum filter. After filtering and leaching in the drum filter in the conventional process, the remaining mud is discarded. The discarded mud generally contains at least 2% (by weight) and often up to about 6% sucrose.

With the method of applicant as provided by this invention, the pH of the cane juice is adjusted as in the conventional process, and the juice is then heated to about 210°–215° F and treated with a suitable flocculating agent such as one of the conventionally used polyelectrolytes. At this point, the heated cane juice is immediately filtered in the manner specified above by introducing the hot coagulating cane juice into the filter tank 28. Precoating will not be necessary in this process.

In this manner, the floc is not disturbed as the juice gently settles in the filter chamber 28. Using apparatus of the approximate dimensions indicated above, and a belt speed of about 21 feet per minute, applicant has found that a mud cake of about one-eighth inch will be deposited on the filter belt as it emerges from sealing engagement with the one-third full filter chamber 28. This mud will generally contain less than 2% sucrose by weight.

In accordance with this process, the cane juice will remain at the elevated temperature in the +200° F range for a period of only ten minutes or so, and certainly much less than an hour, as compared with several hours for the conventional process. This will prevent sucrose losses through inversion on the order of 100% as compared to the conventional processes indicated above.

Filtrate from the filter chamber is passed to an evaporator receiving tank. The filter is then evaporated and processed in the conventional manner in the refining of sugar.

This method of filtering cane juice provides several distinct advantages over the methods of the prior art. For example, it is not necessary to add the bagasse fines to achieve sufficient filtration of the juice. Further, it is necessary to maintain the cane juice at the elevated temperature of about 210° only for a short period of time. Usually, it will be necessary to maintain the elevated temperature for a period of only 10 minutes, rather than the period of 2 to 4 or 6 hours as used in the prior art processes.

Further, the flock is not disturbed as it is in the conventional process, and applicant believes that this contributes measurably to the efficiency of the filtration process.

A substantial savings in power consumption is also realized since the juice does not have to be maintained at the elevated temperature for such a long period of time. In tests, applicant has noted that the filtrate from the cane juice method of this invention is purer, or at least equal in clarity to that from a clarifier in a conventional cane juice process.

Since it is not necessary to add the bagasse fines to the mud, and since the total volume of the muds is reduced, further losses of sucrose are prevented.

Figure 4:
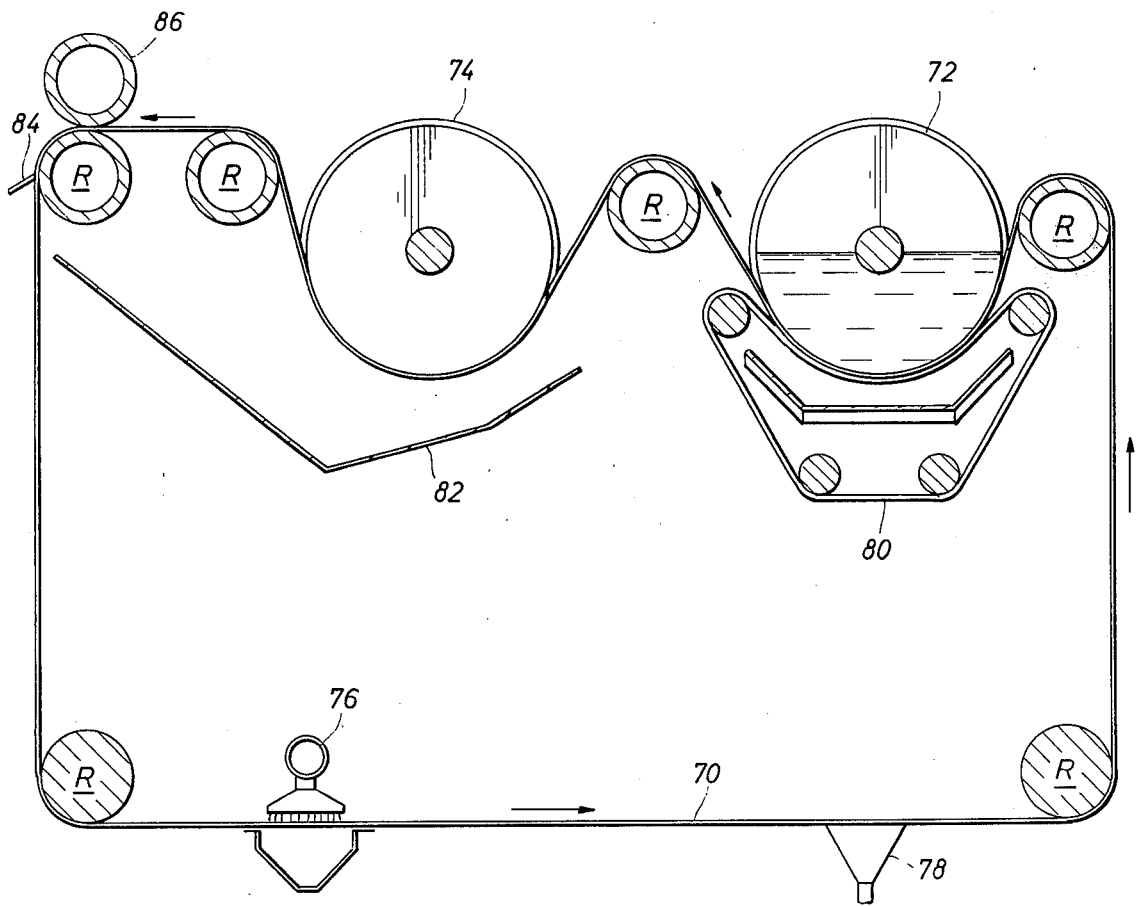
FIG. 4 is a view similar to FIG. 1, illustrating a different form of the apparatus particularly suitable for use in connection with a sugar cane juice filtration process.

As a further embodiment of the invention, applicant finds it convenient to provide a leaching chamber as illustrated in FIG. 4. In accordance with this further embodiment of the invention, a belt 70 constructed like the belt of the FIG. 1 embodiment is provided. The belt follows a path, as shown in the FIG. 4 embodiment, which is similar to that described above, but it is emphasized that the exact path taken by the belt is not of critical importance.

In the FIG. 4 embodiment, the belt 70 travels over a series of positioning rollers R, through the filtration chamber 72 formed by spaced-apart wheels similar to the wheels 50, and thence into a leaching chamber or sweetening-off chamber 74 defined by similar wheels. A compressed air system 76 and a vacuum belt cleaner system 78 similar to those described in connection with the FIGS. 1–3 embodiment may desirably be included.

Troughs 80 and 82 are positioned under the filtration chamber and sweetening-off chamber to catch and preserve the cane juice filtrate. A cake scraper 84 may desirably be included in connection with a pressure dewatering drum 86, the center line of which is offset with respect to its adjacent positioning roller.

In accordance with this embodiment of the invention, pH of the cane juice is adjusted, and the juice is heated and treated with flocculating agent as indicated above. Then, the cane juice is introduced into the filtration chamber 72. Following filtration from the chamber 72, the portion of the belt having disposed fine muds and bagasse fines thereon passes through the sweetening-off chamber 74 and around the pressure dewatering drum 86. Hot water at about 200°–212° F is desirably employed as the leaching agent in the sweetening-off chamber. The sweetening-off chamber is desirably constructed in the same general manner as the filter chamber, with water replacing fluid to be filtered in the chamber. Alternatively, the chamber may take the form of the precoat chamber with the belt traveling, in effect, through a hot water bath.

Applicant has found that, by inclusion of the sweetening-off chamber, the sucrose of the discarded muds contain about 1 to 1½% by weight sucrose, whereas the corresponding muds from conventional drum filters contain approximately 2–5% sucrose. The sweetening-off water which is captured in the trough 80, is desirably recycled and used as maceration water in connection with the crushing process, thereby reclaiming the sucrose contained in the sweetening-off water. Alternatively, the sweetening-off water may be evaporated to recover sucrose therefrom, for example in the manner indicated for the filtrate from the filter chamber. The pressure dewatering drum allows excess water to be squeezed out of the leached-out mud, effecting additional sucrose savings since this water, too, is captured in the trough 80 and recycled. This apparatus might desirably take the form of the dewatering apparatus described above in connection with the FIG. 1 embodiment of the invention.

Suitable driers, mechanical brushes, or other means may be used in connection with the processes and apparatus described above. For example, see those described in Kracklauer U.S. Pat. No. 3,756,411.

The examples which follow should not be considered as limiting the invention, but rather to illustrate its use in particular contexts especially in processes for filtering of sugar cane juice.

EXAMPLE 1

A gravity filter apparatus having an endless belt was constructed. The filter chamber was comprised of a pair of parallel spaced-apart solid wheels, each 12 inches in diameter, into sealing engagement with which the endless belt was moved. The belt was constructed of a conventional filter cloth material.

Cane juice from a conventional cane crushing process was treated with lime to adjust its pH to 8.2, and then heated to a temperature of about 210° F. A polyelectrolyte flocculating agent was then added to the hot cane juice, and the treated juice was then introduced into the filter chamber, filling the chamber one-third full.

The filter belt was driven at a rate of 21 feet per minute.

A mud filter cake was deposited on the filter belt which measured about ⅛ inch thick. Analysis showed the mud contained 1.0% by weight sucrose.

EXAMPLE II

Example I was repeated using a fresh supply of cane juice from the same process.

Analysis showed the mud from the filter chamber contained 0.8% sucrose.

EXAMPLE III

Example I was repeated using a fresh supply of cane juice from the same process.

Analysis showed the mud from the filter chamber contained 0.9% sucrose.

EXAMPLE IV

Example I was repeated using a fresh supply of cane juice from the same process.

Analysis showed the mud from the filter chamber contained 1.7% sucrose.

EXAMPLE V

Example I was repeated using a fresh supply of cane juice from the same process.

Analysis showed the mud from the filter chamber contained 1.2% sucrose.

EXAMPLE VI

Example I was repeated using a fresh supply of cane juice from the same process.

Analysis showed the mud from the filter chamber contained 1.5% sucrose.

In each of the above examples, it was noted that the filtrate from the filter chamber was at least equal in clarity to the juice from clarifying tanks in a conventional sugar cane juice process.

The floor space occupied by the apparatus of Examples I-VI was about 400-500 square feet, as compared to about 1,500 square feet for the conventional drum filter and clarifier.

Applicant estimated the total savings in power costs, sucrose recovery and space costs to be about 75-80% when compared with the conventional clarifier and drum filter system which is used in sugar cane juice processes.

In the manner described above, applicant has provided novel apparatus which is of considerable utility in gravity type industrial filtration apparatus.

Further, applicant has described methods for efficient and economical gravity filtration of fluids.

Still further, applicant has described a method for filtering sugar cane juice by use of a continuous gravity filtration method which will greatly enhance sugar refining process in many contexts of use.

It will be recognized by those of skill in the art, that various changes and modifications may be made in the methods and apparatus shown without departing from the scope of the invention, which is defined by the following claims.

What is claimed is:

1. Apparatus for use in filtering fluids by a gravity filtration process, comprising:

an endless belt having a pair of parallel spaced-apart edges separated by a porous central portion which serves as a filtering media;

an extended portion mounted in sealing engagement with said belt along each of the edges thereof;

said extended portion including a shaped portion presenting a sealing surface, and a chain;

a cylindrical filter vessel comprised of spaced-apart circular end members with at least one connecting member therebetween, said end members having inner and outer surfaces, and a peripheral surface around the outer rim thereof;

guiding means around the circumference of said outer surface to mate with and guide said chain;

a machined portion on said peripheral surface, in leakproof sealing engagement with said sealing surface of said shaped portion;

wherein said filter belt may be removed from said extended portions for replacement of cleaning, and whereby turning of said filter vessel acts to move said filter belt in a constant manner such that said belt is not stretched, wrinkled, or misaligned as the filtration process proceeds.

2. Apparatus for use in filtering fluids by a gravity filtration process, comprising:

an endless belt constructed of a porous material suitable for filtering fluids, said belt being mounted to an extended portion along each of the edges thereof;

a cylindrical filter vessel comprised of spaced-apart circular end members with at least one connecting member therebetween;

means on said end members to drive said filter belt in a constant manner;

means for detachably removing said filter belt for cleaning or replacement; and means for cleaning filter cake from said filter belt, and for maintaining the essential porosity of said belt.

3. Apparatus in accordance with claim 2, wherein said means for maintaining the essential porosity of said belt include a closed vessel connected to a vacuum pump to maintain said vessel under vacuum; and a receptacle head in communication with said vessel and mounted adjacent said filter belt in a manner such that substantially the entire surface of said belt passes across said receptacle head as the belt rotates through its endless path, whereupon filter cake may be drawn off said filter belt through said receptacle head and pass into said vessel.

4. Apparatus for use in connection with an endless belt gravity filter which includes a filter roller, comprising:

a compression roller adapted to exert pressure on said belt after a filter cake has been deposited thereon;

a vacuum roller on the side of said belt opposite said compression roller but adjacent thereto, so that said belt is squeezed as it passes therebetween, said vacuum roller being maintained at a pressure considerably less than atmospheric; and means for removing liquid from said vacuum roller, said rollers acting simultaneously in combination to remove excess moisture from said filter cake.

5. A method for filtering fluids comprising;

providing an endless belt constructed of a material suitable for filtering fluids, a series of rollers over which said endless belt is disposed, and at least a pair of parallel spaced-apart wheels into which a portion of said belt moves in sealing engagement to form a filter chamber;

introducing a fluid to be filtered into said filter chamber;

precoating a first section of said endless belt;

moving said first section into sealing engagement with said spaced-apart wheels, while maintaining said sealing engagement, the fluid to be filtered passing by gravity through said belt, whereupon a filtrate drops through said belt and filter cake forms thereon;

collecting said filtrate;

removing said filter cake from said belt to maintain the essential porosity of said belt, by contacting said first section of the belt with a receptacle head connected to a vaccum chamber, whereupon filter cake is drawn off the filter belt and then flows into said vacuum chamber; and removing said filter cake from said vacuum chamber.

6. A method for processing sugar cane juice comprising:

providing an endless belt which is constructed of a material suitable for filtering cane juice, rollers around which said belt is positioned including a pair of parallel spaced-apart wheels into which a portion of said belt moves in sealing engagement to form a filter chamber;

heating the cane juice to be filtered to a temperature of about 210° F, and maintaining said cane juice at said elevated temperature no more than about 1 hour;

introducing the heated cane juice into said filter chamber;

rotating said endless belt through said filter chamber, to continuously move said cane juice therethrough by gravity filtration; and capturing the filtrate which drains through said filter belt for further processing to obtain the sucrose therefrom.

7. The method in accordance with claim 6, wherein said cane juice is maintained at a temperature of more than about 200° F, for a total of no more than about 30 minutes.

8. A method for processing sugar cane juice comprising:

providing an endless belt which is constructed of a material suitable for filtering cane juice, rollers around which said belt is positioned including a pair of parallel spaced-apart wheels into which a portion of said belt moves in sealing engagement to form a filter chamber, and at least one roller forming a sweetening-off chamber;

heating the cane juice to be filtered to an elevated temperature of about 210° F, and maintaining said cane juice at said elevated temperature for no more than about one hour;

introducing the heated cane juice into said filter chamber;

rotating said endless belt through said filter chamber, to continuously move said cane juice therethrough by gravity filtration, whereupon muds are deposited on said filter belt;

thence moving the portion of said belt having said muds thereon, over said roller forming said sweetening-off chamber;

leaching the muds disposed on said filter belt in said sweetening-off chamber; and capturing both the filtrate from the filter chamber, and the sucrose-containing fluids from the sweetening-off chamber, for further processing to obtain the sucrose therefrom.

9. The method in accordance with claim 8, wherein the sucrose-containing fluid from said sweetening-off chamber is recycled for use as maceration water in the crushing of sugar cane.

* * * * *

UNITED STATES PATENT OFFICE
CERTIFICATE OF CORRECTION

Patent No. 4,057,437        Dated  Nov. 8, 1977

Inventor(s) Aloysius C. Kracklauer

It is certified that error appears in the above-identified patent and that said Letters Patent are hereby corrected as shown below:

Column 3, line 61, "22" should read --24--;

Column 7, line 42, after the word "only" insert the word --about--; and

Column 7, line 45, delete the word "flock" and insert the word --floc-- therefor.

Signed and Sealed this

Sixth Day of June 1978

[SEAL]

Attest:

RUTH C. MASON
Attesting Officer

DONALD W. BANNER
Commissioner of Patents and Trademarks